3,244,731
GLYCIDYL ETHERS
Graham Winfield, Harlton, Cambridgeshire, and Edward William Garnish, Saffron Walden, Essex, England, assignors to Ciba Limited, Basel, Switzerland, a company of Switzerland
No Drawing. Filed Apr. 10, 1962, Ser. No. 186,316
Claims priority, application Great Britain, Apr. 13, 1961, 13,401/61; June 9, 1961, 21,023/61
14 Claims. (Cl. 260—348)

This invention relates to a new class of glycidyl ethers, to processes for the production of such glycidyl ethers and to the uses of the gycidyl ethers.

According to the present invention there is provided a new class of chemical compounds conforming to the general Formula I:

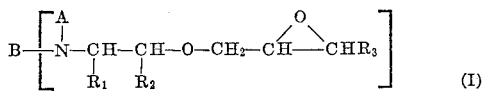 (I)

wherein B represents a substituted or unsubstituted, mono nuclear or polynuclear aromatic residue with X valencies, A represents an aliphatic, cycloaliphatic, araliphatic or aromatic hydrocarbon residue or a grouping of the formula:

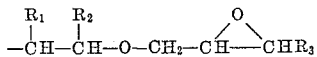

and where $R_1$ and $R_2$ when taken separately represent hydrogen atoms or saturated or unsaturated aliphatic, aromatic or araliphatic hydrocarbon residues or when taken together represents a chain of three or four methylene groups and $R_3$ represents a hydrogen atom or a methyl group, and X is an integer of at least 1.

The epoxide compounds of general Formula I are transparent and liquid at room temperature or readily fusible and may be readily reacted, either alone or in admixture with the commonly known epoxy resins, with the usual hardening agents employed for the known epoxy resins, such as dicarboxylic anhydrides, amines, polyphenols and Lewis acids. A particular advantage associated with the compounds of the general Formula I is that, when used either alone or in admixture with the commonly known epoxide resins, they give a very rapid cure when anhydrides, and/or polyphenolic curing agents are employed.

The new materials therefore find use both as rapidly hardenable resins and as accelerators in systems containing a commonly known epoxide resin together with an anhydride and/or polyphenolic curing agent. In this latter capacity they have a decided advantage over the currently used tertiary amines such as benzyldimethylamine in that they form stable, storable mixtures with known epoxide resins and consequently the resin and curing agent can be supplied as a two component system. When a tertiary amine such as benzyldimethylamine is used as an accelerator it cannot be supplied in admixture with the resin because such a mixture will gel on storage, and therefore a three component system is necessary.

One preferred group of epoxide compounds according to the present invention is constituted by the mononuclear compounds of the general Formula II.

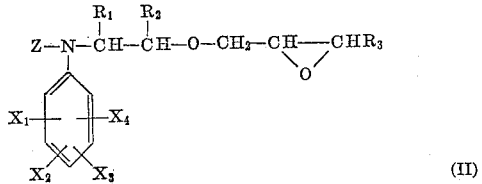 (II)

in which $R_1$, $R_2$ and $R_3$ have the meanings assigned to them above, Z represents a monovalent aliphatic, cycloaliphatic, araliphatic or aromatic hydrocarbon residue and $X_1$–$X_4$ each represents hydrogen atoms or halogen atoms, alkoxy groups nitro groups or aliphatic, cycloaliphatic or araliphatic hydrocarbon groups or two of the X together may represent a fused benzene or other aromatic ring. Compounds of the general Formula II contain only one glycidyl ether grouping and in many cases are particularly valuable as reactive diluents for epoxy resins containing two or more reactive epoxy groups. The simpler members of this class, e.g. those where $R_1$ and $R_2$ are hydrogen atoms and those where Z is a lower alkyl group (containing for example up to 3 carbon atoms), are mobile liquids and may be used as viscosity modifiers for conventional polyepoxide compositions. Furthermore, compounds of the general Formula II when used in admixture with polyepoxides serve to control the degree of crosslinking in the cured epoxy resin composition and in addition may be used as components of polyesters.

Another preferred group of compounds within the scope of the present invention is constituted by compounds of the general Formula III:

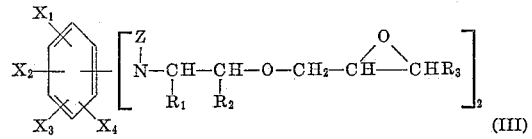 (III)

in which the groups $X_1$–$X_4$, Z, $R_1$, $R_2$ and $R_3$ have the meanings assigned to them above. These compounds contain two reactive epoxide groups and are particularly valuable in that they give hard, insoluble and infusible compositions when treated with hardening agents such as dibasic acid anhydrides, polybasic acids and phenols, polyamines and other commonly known curing agents for epoxy resins.

A further preferred group of mononuclear compounds according to the present invention is constituted by compounds of the general Formula IV:

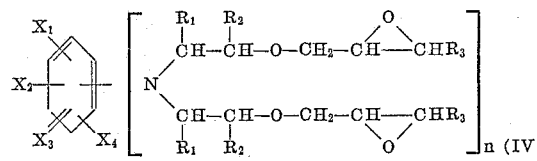 (IV)

where $n$ is 1 or 2 and $X_1$–$X_4$, $R_1$, $R_2$ and $R_3$ have the meanings assigned to them above.

A further preferred group of compounds according to the present invention is constituted by the compounds of general Formula V:

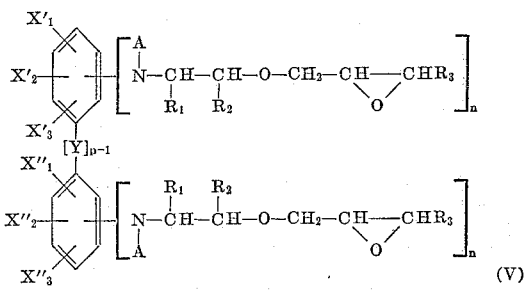 (V)

in which A, $R_1$, $R_2$ and $R_3$ and $n$ have the meanings given to them above, Y represents a divalent radical such as an oxygen or sulfur atom, a sulfone ($SO_2$) grouping, a carbonyl group

or a disubstituted carbon atom of the type

where $a$ and $b$ taken singly may be hydrogen atoms or simple alkyl groups of 1 to 4 carbon atoms or where $a$ and $b$ taken together represent a chain of 4 or 5 methylene groups, $p$ is 1 or 2, and $X'_1$–$X'_3$ and $X''_1$–$X''_3$ each represent hydrogen atoms, halogen atoms, alkoxy groups, nitro groups or aliphatic, cycloaliphatic, araliphatic hydrocarbon groups, or two of the $X'$ or $X''$ together may represent a fused benzene or other aromatic ring.

Another preferred class of compounds according to the present invention are polynuclear compounds of the general Formula VI:

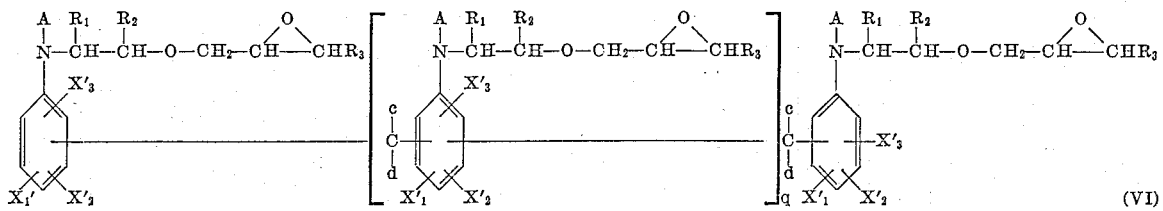 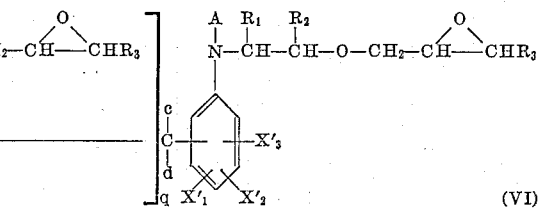   (VI)

where A, $X'_1$–$X'_3$, $R_1$, $R_2$ and $R_3$ have the meanings previously assigned, $c$, $d$, represent hydrogen atoms or lower alkyl groups of not more than 4 carbon atoms and where $q$ is 1 or a high integer.

According to a further feature of the invention the glycidyl ethers of the present invention are produced by the reaction of substances containing one or more of the groupings of general Formula VII:

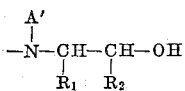   (VII)

attached to an aromatic nucleus (where $R_1$ and $R_2$ have the meanings previously assigned and A' represents a monovalent aliphatic, cycloaliphatic, araliphatic or aromatic hydrocarbon residue or is a group of the general formula:

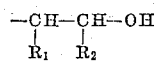

(where $R_1$ and $R_2$ have the meanings previously assigned) with epichlorhydrin, glycerol dichlorohydrin or other halohydrin or epihalohydrin, or with the 3-methyl analogous such as 2,3-epoxybutylchloride in the presence of suitable bases. For the production of compounds with a high epoxy value it is preferable to employ the epichlorohydrin or analogous epihalohydrin or dihalohydrin in excess of the stoichiometric quantity; use of the stoichiometric quantity or of a deficiency of the epihalohydrin or dihalohydrin gives rise to high molecular weight products formed by further reaction of alcohols involved with the epoxy groups in the resin, analogous to those produced from polyphenols and epichlorohydrin. Suitable bases for the condensation are sodium hydroxide and potassium hydroxide.

The hydroxide is usually employed in the ratio 1 to 1.5 equivalents per equivalent of hydroxyl group in the N-arylethanolamine and may be added to the mixture of the N-arylethanolamine and the epihalohydrin portionwise as a solid, or as a solution or suspension.

The reaction may be conducted, for example, at temperatures within the range 20 to 180° C., but is preferably conducted between 40° C. and the boiling point of the mixture. Preferably, when the reaction is complete, the inorganic salt formed during the reaction is removed by filtration and/or with water and the excess epihalohydrin and solvent removed by vacuum distillation.

It is to be noted that the production of the glycidyl ethers and substituted glycidyl ethers of N-arylethanolamines as just described is essentially similar to the production of glycidyl ethers of phenols. It differs considerably from the method employed for the production of glycidyl ethers of polyols, which cannot be produced in good yield by a one step method from the epihalohydrin and the polyol in alkali but necessitate the prior reaction of the epihalohydrin with the polyol in the presence of a Lewis acid followed by alkali-catalyzed ring closure to the glycidyl ether. The use of Lewis acids also causes the production of by-products such as polymers of the epihalohydrin, and deleterious products containing ionisable halogen, by reaction of epihalohydrin with the halohydrin first formed from the alcoholic groups of the polyol and the epihalohydrin, e.g.:

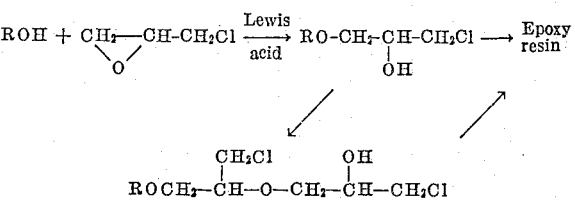

The alcohols of general Formula V may also be converted into their glycidyl ethers using the two step reaction involving Lewis acids but less pure products are formed and the direct alkali-catalysed reaction is preferred.

The N-arylethanolamines of the present invention are readily obtained by condensation of 1:2-epoxides or the corresponding halohydrins with aromatic amines and polyamines. Suitable 1:2-epoxides for the preparation of the N-arylethanolamines used in the present invention as precursors of the glycidyl and substituted glycidylethers are ethylene oxide, propylene oxide, 1:2-epoxybutane, 2:3-epoxybutane, butadiene monoxide, allyl glycidyl ether, cyclohexane oxide, cyclopentane oxide and styrene oxide. The epoxides may be directly reacted with the aromatic amines, or the corresponding halohydrins may be employed in the presence of a base to effect elimination of the haloacid.

Suitable aromatic amines for the production of the mononuclear N-arylethanolamines which are employed as intermediates for the production of glycidyl ethers of general Formula II are: N-methylaniline, N-methyltoluidine, N-ethyl-toluidine, N-ethyl, O-ethyl and p-ethylaniline, p-chloro-N-methyl aniline, p-chlorotoluidine, p-methoxy-N-methylaniline, diphenylamine, N-cyclohexyl-aniline, N-methyl α- and β-naphthylamine.

Suitable aromatic amines for the production of the mononuclear N-aryl ethanolamines employed as intermediates for the production of glycidyl ethers of general Formula III are: N,N'-dimethyl o-, m- and p-phenylene diamine, N,N'-diethyl o-, m- and p-phenylene diamine, N,N'-dimethyl-2,4-diaminotoluene, N,N'-dimethyl-2,4-diaminochlorobenzene.

Suitable aromatic amines for the production of mononuclear N-aryl ethanolamines employed as intermediates for the production of glycidyl ethers of general Formula IV are: aniline, o-, m-, p-toluidine, o-, m-, p-nitro-aniline, 2,4-dinitroaniline, o-, m-, p-anisidine, the chloroanilines, the bromoanilines, o-, m-, p-phenylene diamine, o-, m-, p-ethylaniline, α- and β-naphthylamine.

Suitable aromatic amines for the production of dinuclear N-aryl ethanolamines of general Formula VIII:

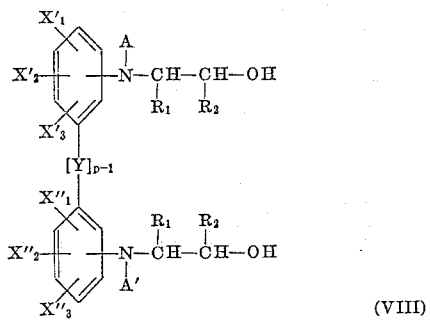

where A', R₁, R₂, Y, X′₁–X′₃, X″₁–X″₃ and p have the meanings given above, which are converted into the glycidyl ethers of general Formula V are: benzidine, o- and p-toluidine, o- and p-dianisidine, diaminodiphenylsulfone, diamino-diphenyl ketone, diaminodiphenylether, diaminodiphenyl sulfide, methylene dianiline, N,N'-dimethylmethylenedianiline, methylene ditoluidine, 2-ethyl methylene dianiline and like dinuclear aromatic amines which are normally prepared by the controlled acid-catalysed condensation of mononuclear aromatic amines such as aniline, N-methylaniline and the toluidines with aliphatic aldehydes and ketones such as formaldehyde, acetaldehyde, propionaldehyde, acetone, methyl ethyl ketone, cyclopentanone and cyclohexanone. It is noteworthy that many of the dinuclear N-aryl ethanolamines may also be obtained by the direct condensation of mononuclear N-aryl ethanolamines with suitable aldehydes and ketones.

Suitable polyamines for the production of the polynuclear N-aryl ethanolamines of general Formula IX:

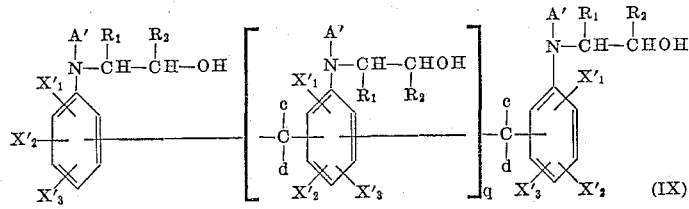

used in the production of polyglycidyl ethers of general Formula VI, wherein A', c, d, R₁, R₂, q and X′₁–X′₃ have the meanings previously given, are aniline formaldehyde resins, toluidine formaldehyde resins and the polynuclear polyamines of general Formula X:

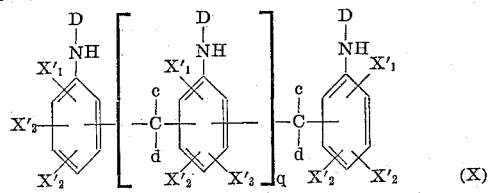

wherein c, d, q, and X′₁–X′₃ have the meanings previously assigned and D represents a hydrogen atom, or a monovalent hydrocarbon substituent such as an aliphatic, cycloaliphatic or aromatic residue, and which are formed by the reaction of aromatic primary and secondary amines containing at least two hydrogen atoms in the aromatic nucleus with aldehydes and ketones such as formaldehyde, acetaldehyde, propionaldehyde and acetone; the most readily available being the aniline formaldehyde condensates. The polynuclear N-aryl-ethanolamines derived from the aniline formaldehyde resins of general Formula X may also readily be formed by the reaction of formaldehyde on the corresponding mononuclear aryldiethanolamines.

The epoxides of general Formula I react with the following hardeners: amines such as aliphatic and aromatic primary and secondary amines, e.g. mono-, di-, and tri-butylamine, p-phenylenediamine, bis-(p-aminophenyl)-methane, ethylenediamine, N:N-diethyl-ethylenediamine, diethylenetriamine, tetra - (hydroxyethyl) - diethylenetriamine, triethylene-tetramine, tetraethylenepentamine, diethylamine, triethanolamine, piperidine, guanidine, and guanidine derivatives, such as phenyl-guanidine and diphenylguanidine, dicyandiamide, aniline - formaldehyde resins, polymers of aminostyrenes, polyamides, e.g. those from aliphatic polyamines and di- or trimerized unsaturated fatty acids, isocyanates, isothiocyanates, polyhydric phenols, e.g. resorcinol, hydroquinone, and bis(4-hydroxyphenyl)-dimethylmethane, phenol-aldehyde resins, oil-modified phenol-aldehyde resins, reaction products of aluminum alkoxides or phenolates with tautomeric reacting compounds of the acetoacetic ester type. Polybasic carboxylic acids, and anhydrides thereof, for example phthalic anhydride, methylenedomethylene-tetrahydrophthalic anhydride, dodecenylsuccinic anhydride, hexahydrophthalic anhydride, hexachloroendomethylene-tetrahydrophthalic anhydride or endomethylene - tetrahydrophthalic anhydride or mixtures thereof, maleic or succinic anhydride. Mannich bases and Friedel-Crafts catalysts, e.g. AlCl₃, SnCl₄, SnCl₂, BF₃, and their complexes with organic compounds and phosphoric acid will also effect hardening of compounds of general Formula I by catalysing their homopolymerization.

According to a further feature of the present invention therefore, there are provided hardenable compositions which comprise one or more epoxy compounds of general Formula I together with one or more hardening agents therefore where at least one of the epoxide compounds is a diepoxide.

The hardenable compositions according to the invention may contain a proportion of the said epoxy compounds in which the epoxy group has further reacted with alcohols of general Formula V and/or other polyhydroxy compounds which promote cross-linking, such as hexanetriol. Other epoxies may also be present in the compositions of this invention, e.g. mono- or polyglycidyl ethers of mono- or poly-alcohols, such as butyl alcohol, butane-1:4-diol or glycerine, or of mono- or poly-phenols, such as resorcinol, bis-(4-hydroxyphenyl)-dimethyl-methane or condensation products of aldehydes with phenols (Novolaks), polyglycidyl esters of polycarboxylic acids, such as phthalic acid, or aminopolyepoxides such as are obtained by dehydrohalogenation of the reaction products from epihalohydrins and primary or secondary amines such as n-butylamine, aniline or 4:4'-di(monomethylamino)-diphenylmethane.

The hardenable compositions may also contain fillers, plasticisers and coloring agents, for example, asphalt, bitumen, glass fibers, mica, quartz powder, cellulose, kaolin, finely divided kieselguhr (Aerosil) or metal powder.

The aforesaid compositions may be used in the filler or unfilled state, e.g. in the form of solutions or emulsions, as textile auxiliaries, laminating resins, varnishes, lacquers, dipping resins, casting resins and encapsulating, coating, filling and packing materials, adhesives and the like, as well as for the preparation of such materials. The new resins are especially valuable as insulating materials for the electrical industry.

In the following examples which illustrate the invention, temperature is in centigrade and parts are by weight. Where heat deflection temperatures and flexural strengths are given they were measured in accordance with the procedures laid down and published by The American Society for Testing Materials, the reference numbers of the tests being ASTM D648–56 and ASTM D790–59T respectively.

Example 1

N-phenyldiethanolamine (122 g. 0.66 mol) and epichlorohydrin (370 g. 4 mol) were charged into a flask fitted with stirrer, water entrainer, and reflux condenser. The mixture was heated, to effect solution of the amine. When the solution had reached 80–90° C. a solution of 5 g. of sodium hydroxide in 5 ml. of water and 2.5 ml. of methoxyethanol was added with stirring. An exothermic reaction set in and the mixture began to boil. After initial reaction had abated a further 5 g. of sodium hydroxide, in flake form, was added. The additions of alkali were continued over a period of 3½ hours until a total of 72 g. of sodium hydroxide had been added to the flask. The reaction mixture was held at the boiling point by the exothermic reaction and application of heat for a further ¾ hour after the additions had been completed. During this reaction period water in the distillate was collected in the entrainer and epichlorohydrin in the distillate returned to the flask.

The reaction mixture was then allowed to cool slightly, and then filtered and the filtrate evaporated to recover excess epichlorohydrin. The residue was taken up in trichloroethylene, washed with water, and the product recovered by evaportaion of the solvent. The yield was 168 g. (86% of theory) of a liquid amber resin containing 5.24 epoxy eq./kg. and 0.04 chlorohydrin eq./kg. Viscosity at 21° C.:5 poises.

Example 2

20 parts by weight of the resin of Example 1 was mixed with 100 parts by weight of an epoxide resin prepared by the interaction under alkaline conditions, of bis-(4-hydroxyphenyl)dimethylmethane and epichlorohydrin and having an epoxide value of 5.02 equivalents per kilo (Resin A) and 13 parts by weight triethylenetetramine. This mixture gelled in 1 hour at 40° C. and after a further 2 hours at 100° C. had cured to form a hard, tough resin which has a heat deflection temperature of 96° C. and a flexural strength of 1181 kg./sq. cm.

Example 3

30 parts by weight of the resin of Example 1 were mixed with 70 parts by weight of Resin A referred to in Example 2 and 77 parts by weight of hexahydrophthalic anhydride. This mixture gelled in 2 hours at 80° C. and after 8 hours at 120° C. had cured to a hard, tough resin which had a heat deflection temperature of 70° C. and a flexural strength of 857 kg./sq. cm.

Example 4

N-phenyldiethanolamine (45 g.) and stannic chloride (0.5 ml.) were measured into a flask fitted with stirrer, dropping funnel, and reflux condenser. The stirred mixture was heated to 80–85° C. Epichlorohydrin (46 g.) was added at this temperature over a period of 15 min. without any detectable exothermic reaction occurring. The internal temperature was then raised to 140° C. and held for sixteen hours.

The reaction mixture was cooled and diluted with methyl ethyl ketone (20 ml.). This solution was stirred vigorously with aqueousسodium hydroxide (20 g. in 30 ml. water) at 40° C. for 1 hour. The organic layer was diluted with a little benzene, was separated and washed with water, and the product was isolated as the residue after evaporating the solvent off under vacuum. Yield: 43 g. dark liquid. Viscosity at 21° C.: 450 poises. Epoxy value 202 eq./kg.

Example 5

N,N-methylphenylethanolamine (100.7 g.) and epichlorohydrin (185 g.) were reacted in the presence of sodium hydroxide (40 g.) in a manner similar to that set out in Example 1. The product was a mobile-red-brown liquid. Yield: 100 g. (72.5%). Epoxy value: 3.02 eq./kg.

Example 6

20 parts by weight of the product of Example 5 were mixed with 100 parts by weight Resin A. This mixture had a viscosity of 59 poises at 21° C. 100 parts by weight of the mixture were stirred with 11 parts by weight triethylene tetramine. This composition gelled in 1 hour at 40° C. and after a further 2 hours at 100° C. had cured to form a hard, tough resin which had a heat deflection temperature of 75° C. and a flexural strength of 1420 kg./sq. cm.

Example 7

N-phenyl-di-2-proponolamine (104.5 g.) and epichlorohydrin (277 g.) were reacted in the presence of sodium hydroxide (60 g.) in a manner similar to that set out in Example 1. The product was a mobile amber liquid. Yield: 138 g. (86%). Epoxy value 4.07 eq./kg.

Example 8

N-m-tolyldiethanolamine (52 g.) and epichlorohydrin (148 g.) were eracted in the presence of sodium hydroxide (32 g.) in a manner similar to that set out in Example 1. The product was an amber liquid. Yield: 66 g. (81%). Epoxy value 4.60 eq./kg. Viscosity at 21° C.: 10 poises.

Example 9

30 parts by weight of the product of Example 8 were mixed with 100 parts by weight Resin A and 13 parts by weight triethylene tetramine. This composition gelled in 1 hour at 40° C. and after a further 2 hours at 100° C. had cured to form a hard, tough resin which had a heat deflection temperature of 64° C. and a flexural strength of 1110 kg./cm. sq.

Example 10

100 parts by weight of the product of Example 8 were warmed with 71 parts by weight hexahydrophthalic anhydride until homogeneous. This composition gelled in 1 hour at 80° C. and after a further 8 hours at 120° C. had cured to form a hard, tough resin, which had a heat deflection temperature of 64° C. and a flexural strength of 1054 kg./sq. cm.

Example 11

N-o-tolyldiethanolamine (27.5 g.) and epchlorohydrin (80 g.) were reacted in the presence of sodium hydroxide (16 g.) in a manner similar to that set out in Example 1. The product was a red-brown liquid. Yield: 38 g. (88%). Epoxy value: 4.83 eq./kg.

Example 12

30 parts by weight of the product of Example 11 were mixed with 100 parts by weight of Resin A. This mixture had a viscosity at 21° C. of 60 poises. 100 parts by weight of this mixture with 11 parts by weight triethylene tetramine gelled in 1 hour at 40° C. and after a further 2 hours at 100° C. had cured to form a hard, brittle resin which had a heat deflection temperature of 36° C. and a flexural strength of 555 kg./sq. cm.

Example 13

100 parts by weight of the product of Example 11 were warmed with 74 parts by weight hexahydrophthalic anhydride until homogeneous. This composition gelled in 2 hours at 80° C. and after a further 8 hours at 120° C. had cured to form a hard resin which had a heat deflection temperature of 59° C. and a flexural strength of 927 kg./sq. cm.

Example 14

Bis-(p-diethanolanilino)ketone (50 g.) and epichlorohydrin (120 ml.) were stirred and heated under reflux, the apparatus being fitted with a water entrainer of the Dean and Stark type. Sodium hydroxide (5 g.) in aqueous 2-methoxy-ethanol was added portionwise over 3 hours. After a further 15 mins. no more water separated out on the water entrainer and diatomaceous earth (10 g.) was added and the cooled mixture filtered. Excess epichlorohydrin was distilled off at 14 mm. pressure (maximum pot temperature 120° C.), the residue taken up in trichloroethylene (250 ml.) and washed with hot water (5×250 ml.) and the solution evaporated at 0.2 mm. (maximum pot temperature 140° C.). The residual bright yellow stiff resin had an epoxy content of 4.4 equivalents per kilo and a low chlorohydrin content (0.042 equivalent per kilo).

Example 15

10 parts by weight of the resin of Example 14 were mixed with 2.2 parts by weight of 4,4'-diamino-diphenylmethane. The mixture gelled within 10 mins. at 140° C. and after a further 16 hours at 140° C. had cured to form a tough, infusible insoluble resin which had a heat deflection temperature of 118° C.

Example 16

(a) 19.4 parts by weight of the resin of Example 1 and 11.4 parts by weight of bis-(4-hydroxyphenyl)dimethylmethane were mixed and heated to 160° C. and the reaction was followed by determination of the epoxy content of the mix. In 2 hours the epoxy value fell from an initial value of 2.67 to an epoxy of 0.50 yielding a brittle solid.

(b) Repetition of the above fusion process in the presence of 0.002 part by weight of lithium chloride gave a final epoxy content of 0.48 after 30 mins. and yielded a brittle resin.

Example 17

70 parts by weight of the resin of Example 1 and 30 parts by weight of a butylated melamine formaldehyde resin (Cibamin N86) and 2 parts by weight of phthalic anyhdride were dissolved in a mixture of xylene and n-butanol and applied to an aluminium panel and the panel stored for 30 mins. at 150° C. when a flexible and acetone-insoluble film was formed.

Example 18

N,N,N',N'-tetraethanolbenzidine (31 g.) and epichlorohydrin (110 ml.) were reacted with sodium hydroxide (20 g.) and the product isolated as in Example 14, affording a light brown stiff resin with an epoxy content of 4.6 equivalents per kilo.

Example 19

10 parts by weight of the resin of Example 18 were mixed with 2.2 parts of 4,4'-diaminodiphenylmethane. The mixture gelled within 10 mins. at 140° C. and after a further 16 hours at 140° C. had cured to a tough insoluble, infusible resin with a heat deflection temperatre of 150° C.

Example 20

10 parts by weight of the resin of Example 18 were mixed with 7.5 parts by weight of methyl nadic anhydride. The mixture gelled at 20° C. within 48 hours to give a brittle solid and the mixture could be cured at 140° C. for 24 hours to a tough resin with a heat deflection temperature of 105° C.

Example 21

Methylene-bis-(p-diethanolaniline) (31.5 g.) and epichlorohydrin (110 ml.) were reacted with sodium hydroxide (20 g.) and the product worked up as described in Example 14, affording a light yellow viscous oil with an epoxy content of 4.8 equivalents per kilo.

Example 22

10 parts by weight of the resin of Example 21 and 2.4 parts by weight of 4,4'-diaminodiphenylmethane were mixed and heated to 140° C. The mixture gelled within 10 mins. and cured within 16 hours to a tough resin with a heat deflection temperature of 109° C.

Example 23

10 parts by weight of the resin of Example 21 and 7.5 parts by weight of methyl nadic anhydride when mixed gelled within 48 hours at 20° C. and could be cured at 140° C. for 24 hours to a tough resin with a heat deflection temperature of 98° C.

Example 24

Isopropylidene-bis(p-diethanolaniline) (35 g.) and epichlorohydrin (100 ml.) were reacted with sodium hydroxide and the product isolated as described in Example 14, giving a light brown stiff resin with an epoxy content of 4.6 equivalents per kilo.

Example 25

10 parts by weight of the resin of Example 24 and 2.2 parts by weight of 4,4'-diaminodiphenylmethane were mixed and the mixture heated at 140° C. Gelation occured within 10 mins. and after 16 hours the mixture had cured to a tough, infusible, insoluble mass with a heat deflection temperature of 119° C.

Example 26

10 parts by weight of the resin of Example 24 and 7.5 parts by weight of methyl nadic anhydride were mixed, the mix gelled after 48 hours at 20° C. to a solid product and when cured at 140° C. for 24 hours gave a tough, infusible, insoluble resin with a heat deflection temperature of 106° C.

Example 27

Methylene (p-diethanolaniline) (m-ethyl-p-diethanolaniline) (80 g.) and epichlorohydrin (200 ml.) were reacted with sodium hydroxide (48 g.) and the product isolated as in Example 14. The residual viscous brown oil (96 g.) had an epoxy value of 4.3 equivalents per kilo.

Example 28

Methylene bis-(p-N-methylethanolaniline) (61.5) and epichlorohydrin (200 ml.) were reacted with sodium hydroxide (24 g.) and the product isolated as in Example 14, giving a stiff brown resin with an epoxy value of 2.0 equivalents per kilo.

Example 29

Bis-(p-diethylanolaniline)ether (69 g.) and epichlorohydrin (200 ml.) were reacted with sodium hydroxide (45 g.) and the product isolated as in Example 14 giving a brown viscous oil with an epoxy value of 4.5 equivalents per kilo.

Example 30

10 parts by weight of the resin of Example 27 and 2.1 parts by weight of 4,4'-diaminodiphenylmethane were mixed and the mixture heated at 145° C. Gelation occurred within 10 mins. and after 28 hours the mixture had cured to a tough, infusible, insoluble mass with a heat deflection temperature of 94° C.

Example 31

10 parts by weight of the resin of Example 27 and 7.4 parts by weight of methyl nadic anhydride were mixed and the mixture gelled after 48 hours at 20° C. to a solid product, and when cured at 145° C. for 28 hours gave a tough infusible, insoluble mass with a heat deflection temperature of 84° C.

Example 32

10 parts by weight of the resin of Example 27 and 1.05 parts by weight of 4,4'-diaminodiphenylmethane were mixed and the mixture heated at 145° C. Gelation occurred within 1 hour and after 28 hours the mixture had cured to an infusible, insoluble mass with a heat deflection temperature of 50° C.

*Example 33*

10 parts by weight of the resin of Example 24 and 2.2 parts by weight of 4,4'-diaminodiphenylmethane were mixed and the mixture heated at 145° C. Gelation occurred within 10 minutes and after 28 hours the mixture had cured to a tough, infusible, insoluble mass with a heat deflection temperature of 150° C.

*Example 34*

10 parts by weight of the resin of Example 29 and 7.5 parts by weight of methyl nadic anhydride were mixed and the mixture gelled after 48 hours at 20° C. to a solid product, and when cured at 145° C. for 28 hours gave a tough, infusible, insoluble mass with a heat deflection temperature of 94° C.

*Example 35*

1.2 parts by weight of the resin of Example 19 was mixed with 50 parts by weight of the Resin A of Example 2 and 21.5 parts by weight of phthalic anhydride. This mixture gelled in 15 minutes at 120° C. and after a further 3 hours at 120° C. had cured to form a hard, tough resin which had a heat deflection temperature of 73° C.

*Example 36*

N-phenyldiethanolamine (46 g., 0.25 mol) and 2,3-epoxybutyl chloride (80 g., 0.75 mol) were reacted with a total of 19 g. of solid sodium hydroxide in the manner described in Example 1, giving a pale yellow liquid (57 g.) containing 3.19 epoxy eq./kg. and 0.03 chlorohydrin eq./kg. Viscosity at 21° C.: 23 poises.

*Example 37*

Bis-(p-diethanolanilino)sulfone (373 parts by weight) and epichlorohydrin (1200 parts by weight) were treated with sodium hydroxide (210 parts by weight) by the method of Example 14. The stiff pale yellow resin had an epoxy content of 4.7 equivalents per kilogram.

*Example 38*

The resin from Example 37 (20 parts by weight) was mixed with 4,4'-diaminodiphenylmethane (4.6 parts by weight) at 100° C. to give a clear mobile liquid. Gelation occurred after being heated at 145° C. for 10 minutes. After being cured at 145° C. for 24 hours the infusible, insoluble, tough product had a heat deflection temperature of 161° C.

*Example 39*

The resin from Example 37 (20 parts by weight) was mixed with 4,4'-diaminodiphenylsulfone (6.5 parts by weight) at 130° C. to give a clear mobile melt. Gelation occurred after 20 minutes at 145° C., and after further heating at 145° C. for 24 hours the infusible, insoluble, tough product had a heat deflection temperature of 182° C.

*Example 40*

The resin from Example 37 (20 parts by weight) was mixed with methyl nadic anhydride (15.4 parts by weight) at 20° C. to give a clear solution. The solution was cured at 145° C. for 24 hours, 160° C. for 40 hours, and finally at 240° C. for 18 hours. The tough, insoluble, infusible product had a heat deflection temperature of 231° C.

*Example 41*

A mixture of N-phenyldiethanolamine (181 g.), concentrated hydrochloric acid (115 g. 36% w./w.) and formalin (75 ml. 40% w./w.) was kept at 98° C. for 64 hours. The product was made alkaline with 50% aqueous caustic soda solution, cooled to 20° C., and the aqueous layer was decanted.

The residual polynuclear ethanolamine was dissolved in epichlorohydrin (460 ml.) and reacted in the presence of caustic soda (120 g.) by the method of Example 14 affording a brown viscous resin with an epoxy content of 4.0 equivalents per kilo.

*Example 42*

20 parts of the resin of Example 41 were mixed with 4 parts of 4,4'-diaminodiphenylmethane. After heating at 135° C. for 24 hours a tough, infusible, insoluble resin with a heat deflection temperature of 135° C. was obtained.

*Example 43*

20 parts of the resin of Example 41 were mixed with 13.4 parts of methylendomethylene-tetrahydrophthalic anhydride and heated for 24 hours at 135° C. followed by 24 hours at 240° C. A tough, infusible, insoluble resin with a heat deflection temperature of 143° C. was obtained.

*Example 44*

In this example the accelerator effect of the diglycidyl ether of N-phenyldiethanolamine (prepared as described in Example 1) on the cure of a Bisphenol A epoxide by anhydrides is illustrated.

The Bisphenol A epoxide was that described as Resin A in Example 2 and the curing time is here defined as the time required for the mixture to become infusible at the curing temperature. Each composition contains 1.00 anhydride equivalent per epoxide equivalent.

The results are listed in the following table:

| Anhydride | Parts of anhydride per 100 parts Resin A | Parts of accelerator per 100 parts Resin A | Curing temperature T° C. | Time to become infusible at temperature T |
|---|---|---|---|---|
| Phthalic Anhydride | 91.7 | 0 | 120 | >168 hours. |
| Do | 96.4 | 5 | 120 | 7.5 hours. |
| Do | 101.0 | 10 | 120 | 6 hours. |
| Hexahydrophthalic Anhydride. | 79.3 | 0 | 100 | 72 hours. |
| Do | 83.3 | 5 | 100 | 2 hours. |
| Do | 87.4 | 10 | 100 | 1.5 hours. |

*Example 45*

In this example the value of compounds of the present invention as reactive diluents in known epoxide anhydride systems, is demonstrated.

The diglycidyl ether of N-phenyldiethanolamine (prepared as described in Example 1) was used as a reactive diluent in a hardenable composition comprising Resin A (prepared as described in Example 2), tris-(dimethylaminomethyl)phenol as accelerator and a mixture of anhydrides as hardening agent.

The composition of the hardening agent was as follows:
78 parts hexahydrophthalic anhydride
13 parts tetrahydrophthalic anhydride
9 parts phthalic anhydride
and sufficient anhydride was added to give 1.0 anhydride equivalent per epoxide equivalent in each formulation.

The curable compositions were formulated as follows:
Composition 1:
    100 parts Resin A
    75.5 parts hardening agent
    1 part accelerator Composition 2:
   20 parts diglycidyl ether of N-phenyldiethanolamine
   100 parts Resin A
   91 parts hardening agent
   1 part accelerator The properties of castings prepared by curing the compositions for 2 hours at 100° C. followed by 2 hours at 180° C. were measured according to the procedures laid down and published by The American Society for Testing Materials. The references to the test methods used are given together with the results obtained in the table.

It can be seen that the useful decrease in viscosity of the uncured composition brought about by the addition of the glycidyl ether of N-phenyldiethanolamine is accompanied by an increase in both flexural strength and modulus of elasticity of the castings and that the concomitant decrease in heat deflection temperature is small.

compounds of the formula

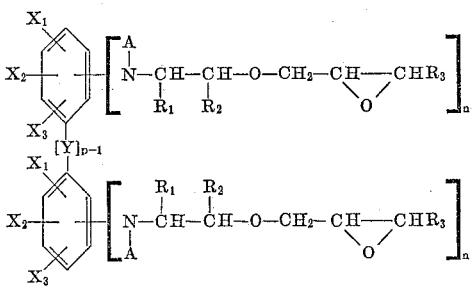

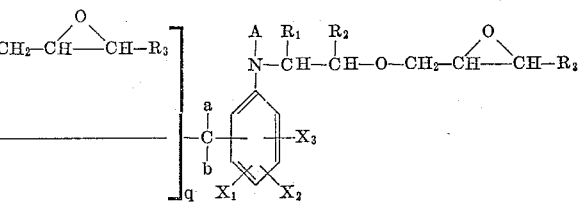

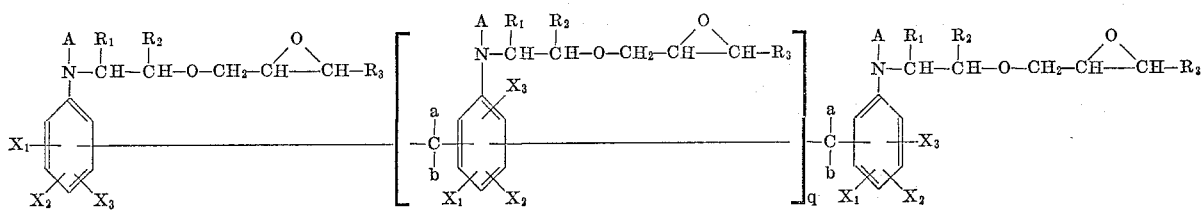

where $X_1$, $X_2$, $X_3$ and $X_4$ each are members selected from the class consisting of hydrogen atom and lower alkyl of 1 to 4 carbon atoms, $R_1$, $R_2$ and $R_3$ each are selected from the class consisting of hydrogen atom and methyl

| Test or property | Test method | Composition 1 | Composition 2 |
|---|---|---|---|
| Viscosity of uncured composition | | 17.4 poises | 10.9 poises. |
| Heat deflection temperature | ASTM D648-56 | 102° C | 90.5° C. |
| Flexural strength | ASTM D790-59T | 1257 kg./sq. cm | 1313 kg./sq. cm. |
| Modulus of elasticity by flexure | ASTM D790-59T | 3.98×10⁴ kg./sq. cm. | 4.06×10⁴ kg./sq. cm. |

What is claimed is:
1. Glycidyl ethers selected from the group consisting of compounds of the formula

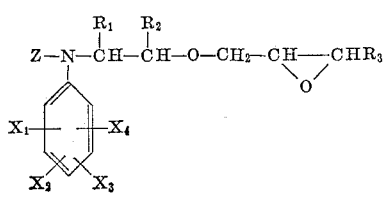

compounds of the formula

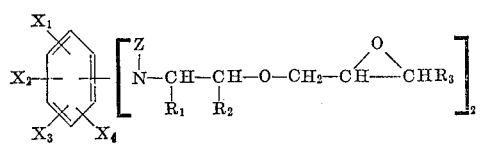

compounds of the formula

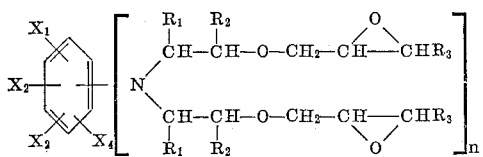

group, Z is a lower alkyl group of 1 to 4 carbon atoms, A represents a member selected from the class consisting of lower alkyl group of 1 to 4 carbon atoms and radical of the formula

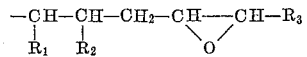

Y is a member selected from the class consisting of

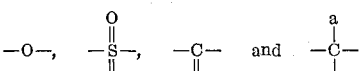

$a$ and $b$ each are selected from the class consisting of hydrogen atom and lower alkyl group of 1 to 4 carbon atoms, $n$ and $p$ represent integers of at least 1 and at most 2, and $q$ is an integer of at least 1.

2. The diglycidyl ether of N-phenyl-diethanolamine.
3. The monogylcidylether of N-methyl-N-phenyl-ethanolamine.
4. The diglycidylether of N-phenyl-di-2-propanolamine.
5. The diglycidylether of N-(m-tolyl)-diethanolamine.
6. The diglycidylether of N-(o-tolyl)-diethanolamine.
7. The tetraglycidylether of bis-(p-diethanol-anilino)-ketone.
8. The tetraglycidyl ether of methylene-bis (p-diethanol-aniline).
9. The diglycidyl ether of methylene-bis-(p-N-methylethanol-aniline).
10. The tetraglycidyl ether of bis(p-diethanol-aniline) ether.
11. The tetraglycidyl ether of bis(p-diethanol-anilino) sulfone.
12. The tetraglycidyl ether of isopropylidene-bis(p-diethanol-aniline).
13. The tetraglycidyl ether of N,N,N',N'-tetraethanol-benzidine.
14. The di(2,3-epoxybutyl)ether of N-phenyl-diethanolamine.

(References on following page)

References Cited by the Examiner

UNITED STATES PATENTS

| | | | |
|---|---|---|---|
| 2,131,142 | 9/1938 | Orthner et al. | 260—348 |
| 2,143,388 | 1/1939 | Schlack | 260—348 |
| 2,568,744 | 9/1951 | Kocher | 260—348 |
| 2,700,686 | 1/1955 | Dickey et al. | 260—348 |
| 3,051,664 | 8/1962 | Turner | 260—348 |

OTHER REFERENCES

Chemical Abstracts, 43, 7697 g–h (1949).

Paquin, Epoxydverbindungen und Epoxydharze, Springer-Verlag.

Republic of South Africa Patent Journal, vol. 2, No. 59, page 27 (July 18, 1962).

WILLIAM H. SHORT, *Primary Examiner.*

NICHOLAS S. RIZZO, *Examiner.*

J. P. FRIEDENSON, S. N. RICE, *Assistant Examiners.*